(12) United States Patent
Feldtkeller

(10) Patent No.: US 9,124,194 B2
(45) Date of Patent: Sep. 1, 2015

(54) METHODS AND SYSTEMS FOR A FULL-BRIDGE VOLTAGE CONVERTING DEVICE

(71) Applicant: Infineon Technologies Austria AG, Villach (AT)

(72) Inventor: Martin Feldtkeller, Munich (DE)

(73) Assignee: Infineon Technologies Austria AG, Villach (AT)

( * ) Notice: Subject to any disclaimer, the term of this patent is extended or adjusted under 35 U.S.C. 154(b) by 113 days.

(21) Appl. No.: 13/908,883

(22) Filed: Jun. 3, 2013

(65) Prior Publication Data

US 2014/0355323 A1 Dec. 4, 2014

(51) Int. Cl.
*H02M 7/5387* (2007.01)

(52) U.S. Cl.
CPC .................................. *H02M 7/5387* (2013.01)

(58) Field of Classification Search
CPC .................................................. H02M 7/5387
USPC ................. 363/16–20, 21.01, 37, 61, 98, 132
See application file for complete search history.

(56) References Cited

U.S. PATENT DOCUMENTS

| 5,940,331 | A | * | 8/1999 | Kagami | 365/189.05 |
|---|---|---|---|---|---|
| 6,078,512 | A | * | 6/2000 | Bouvier | 363/127 |
| 6,349,047 | B1 | * | 2/2002 | Yu | 363/127 |
| 6,574,125 | B2 | * | 6/2003 | Matsukawa et al. | 363/71 |
| 7,903,438 | B2 | * | 3/2011 | Lu | 363/71 |
| 8,248,141 | B2 | * | 8/2012 | Zierhofer | 327/330 |
| 2004/0037092 | A1 | * | 2/2004 | Kurio et al. | 363/17 |
| 2015/0003132 | A1 | * | 1/2015 | Woywode et al. | 363/132 |

* cited by examiner

*Primary Examiner* — Emily P Pham
(74) *Attorney, Agent, or Firm* — Slater & Matsil, L.L.P.

(57) ABSTRACT

A device includes a full-bridge configured to convert a direct current (DC) voltage to an alternating current (AC) voltage. The full-bridge includes at least first, second, third and fourth bridge sections. Each of the first, second, third and fourth bridge sections includes a switch of a first type configured to switch in response to a first voltage level and a switch of a second type configured to switch in response to a second voltage level different than the first voltage level. The switch of the second type is configured to be driven using an inductive current of a load coupled to an output of the full-bridge.

30 Claims, 7 Drawing Sheets

METHODS AND SYSTEMS FOR A FULL-BRIDGE VOLTAGE CONVERTING DEVICE

TECHNICAL FIELD

The present invention relates generally to methods and systems for converting DC-voltages to AC-voltages, and, in particular embodiments, to such methods and systems using converters in full-bridge configuration to convert DC-voltages into high-frequency AC-voltages.

BACKGROUND

Commonly, the above-mentioned DC-to-AC converters are also referred to as inverters or inverted rectifiers and throughout this application the expressions may be used interchangeably. In general, the converters should exhibit a high degree of efficiency in converting DC-power to AC-power. Typically, the type of converters is required for the power transfer via air-core coil, so-called "coreless transformers." Such "coreless transformers" may also be implemented in the metal layers of integrated circuits, and, as such, exhibit an acceptable degree of efficiency only starting from an operating frequency of several hundred megahertz.

Generally, in the design of high-frequency converters, the degree of efficiency may be increased by increasing the channel widths of the switching transistors which reduces the on-state resistances. However, in doing so, more power is required for driving the gates of the switching transistors. Thus, the total degree of efficiency exhibits a maximum over varying channel width, the magnitude of which is specific for the used integrated circuit technology. Conventionally, the drivers for the gates of the switching transistors are supplied by the available DC-voltage, and, hence, draw power from the DC-voltage source. As a result, the total degree of efficiency of the DC-to-AC converter is reduced.

Hence, systems and methods for increasing the total degree of efficiency in converting a DC-voltage to an AC-voltage would be desirable. For these or other reasons, there is a need for the present invention.

SUMMARY OF THE INVENTION

Methods and systems for converting a DC-voltage to an AC-voltage and for synchronizing switching instants of corresponding full-bridge converters are provided, substantially as shown in and/or described in connection with at least one of the figures, as set forth more completely in the claims.

Embodiments relate to systems and methods converting a DC-voltage to an AC-voltage by a device configured as a full-bridge, comprising using in each of a first, second, third and fourth bridge sections of the full-bridge a switch of a first class coupled in series with a switch of a second class, wherein each switch of the first class is adapted to use less switching energy per switching operation than each switch of the second class, wherein the switches of the second class of the fourth and the third bridge sections are coupled in series at a first output node of the device, and the switches of the second class of the first and the second bridge sections are coupled in series at a second output node of the device, wherein control terminals of the switches of the second class of the first and the second bridge sections are coupled together and coupled to the first output node, and control terminals of the switches of the second class of the fourth and the third bridge sections are coupled together and coupled to the second output node, and driving the switches of the second class based on a reactive power provided by an inductive component of a load connected between the first and second output nodes.

Further features and advantages of embodiments will become apparent from the following detailed description made with reference to the accompanying drawings.

BRIEF DESCRIPTION OF THE DRAWINGS

The accompanying drawings are included to provide a further understanding and are incorporated in and constitute a part of this specification. The drawings relate to examples and embodiments and together with the description serve to explain the principles of the invention. Other embodiments and many of the intended advantages of embodiments will be readily appreciated as they become better understood by reference to the following detailed description.

DETAILED DESCRIPTION OF ILLUSTRATIVE EMBODIMENTS

In the following Detailed Description, reference is made to the accompanying drawings, which form a part hereof, and in which are shown by way of illustration specific embodiments. It is to be understood that other embodiments may be utilized and structural or other changes may be made without departing from the scope of the present invention. The following detailed description, therefore, is not to be taken in a limiting sense, and the scope of the present invention is defined by the appended claims.

In the following, for illustration purposes, the invention will be described with reference to converters for very high-frequencies in the order of several hundred megahertz. However, the invention is not so limited and may find its application in conjunction with converting DC-voltages into AC-voltages of lower or even higher frequencies.

Figure 1:
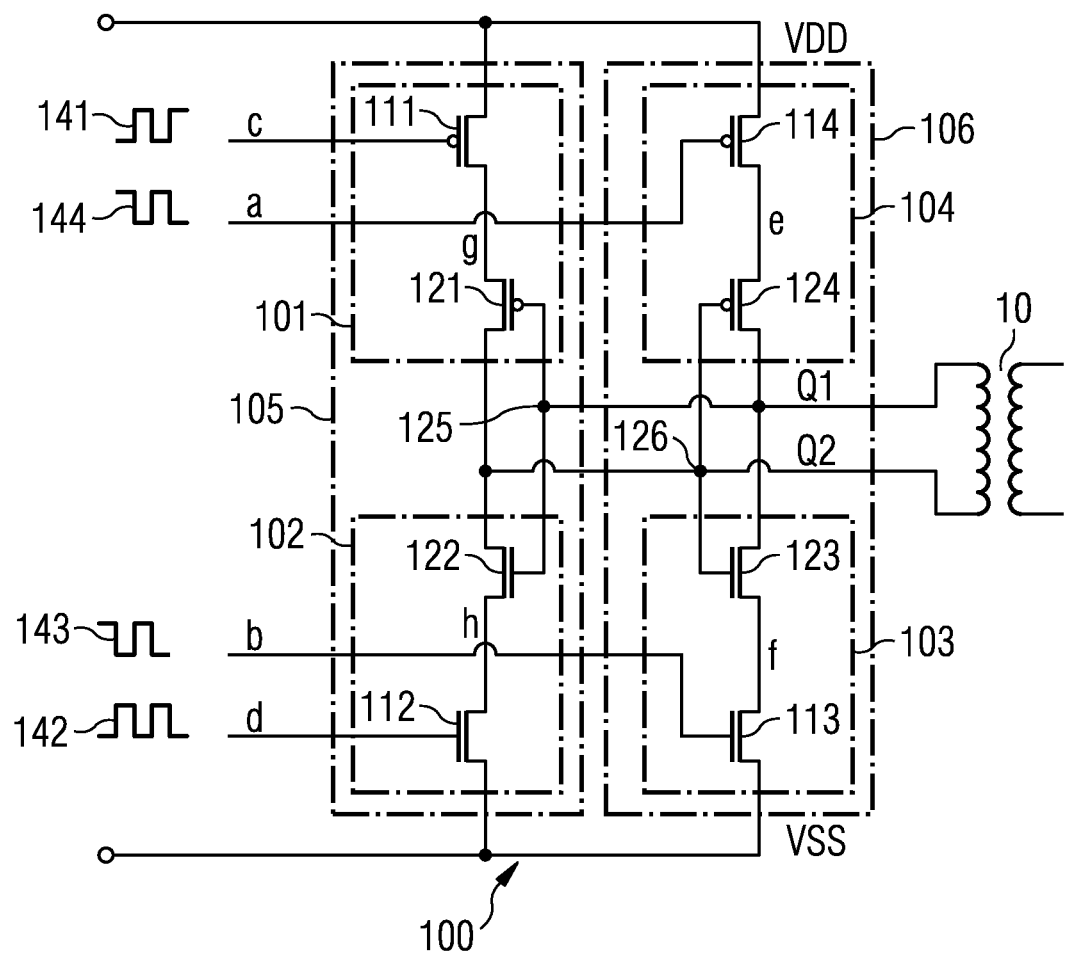
FIG. 1 shows a schematic of one example of a full-bridge DC-to-AC converter (in the following inverted rectifier) according to an embodiment with a coreless transformer as an inductive load at the inverted rectifier's outputs.

FIG. 1 shows a schematic of a full-bridge inverted rectifier 100 according to an embodiment. As shown, the inverted rectifier 100 may be coupled to a coreless transformer 10 as an inductive load at the inverted rectifier's outputs Q1 and Q2.

Furthermore, the inverted rectifier 100 may comprise a first half-bridge 105 and a second half-bridge 106 as schematically designated with the corresponding dashed box arranged around the components of the first half-bridge 105 and the second half-bridge 106 respectively. Moreover, the first half-bridge 105 may comprise a first bridge section 101 and a second bridge section 102, whereas the second half-bridge 106 may comprise a third bridge section 103 and a fourth bridge section 104 of the four bridge sections of the full-bridge inverted rectifier 100.

The first half-bridge 105 may comprise a first p-channel transistor 111 of a first class which may be a first, lower voltage rating, a first p-channel transistor 121 of a second class which may be a second, higher voltage rating, a first n-channel transistor 122 of the second class, and a first n-channel transistor 112 of the first class all coupled or cascaded in series.

Correspondingly, the second half-bridge 106 may comprise a second p-channel transistor 114 of the first class, a second p-channel transistor 124 of the second class, a second n-channel transistor 123 of the second class, and a second n-channel transistor 113 of the first class all coupled in series.

As shown in FIG. 1, the gates of the first p-channel transistor 121 of the second class and the first n-channel transistor 122 of the second class in the first half-bridge 105 may be coupled together in a first common gate node 125. Correspondingly, also the gates of the second p-channel transistor 124 of the second class and the second n-channel transistor 123 of the second class in the second half-bridge 106 may be coupled together in a second common gate node 126.

Furthermore, the first common gate node 125 may be coupled to a series coupling node between the second p-channel transistor 124 of the second class and the second n-channel transistor 123 of the second class in the second half-bridge 106 to form the first output node Q1 of the inverted rectifier 100.

Accordingly, the second common gate node 126 may be coupled to a series coupling node between the first p-channel transistor 121 of the second class and the first n-channel transistor 122 of the second class in the first half-bridge 105 to form the second output node Q2 of the inverted rectifier 100.

As mentioned, the transistors of the inverted rectifier 100 of the first class and the second class may comprise transistors of different voltage ratings, namely a first class or first lower voltage rating of the transistors 111, 112, 113 and 114 as well as a second class or second higher voltage rating of the transistors 121, 122, 123 and 124. For instance, semiconductor manufacturing processes to produce CMOS integrated circuits for complex digital circuits, may implement transistors of different, and typically at least two voltage ratings. For example, transistors of a first, lower voltage rating for the complex logic circuits, and transistors of a second, higher voltage rating for interfacing with input/output (I/O) ports of a corresponding integrated circuit.

Typically, the transistors of the lower voltage rating have smaller dimensions than the transistors of the higher voltage rating. Because of the smaller dimensions of the transistors of the lower voltage rating, the resulting lower parasitic elements of the smaller the transistors allow for higher switching speeds than the higher parasitic elements of the transistors of the higher voltage rating. In other words, a transistor of the lower voltage rating may be driven to complete a switching operating using less charge and energy than to drive a transistor of the higher voltage rating to complete a switching operating.

As in the embodiment of the inverted rectifier 100 in FIG. 1, each of the first, second, third and fourth bridge sections 101, 102, 103 and 104 of the inverted rectifier 100 may comprise a transistor 111, 112, 113 and 114 of a lower voltage rating respectively cascaded in series with a transistor 121, 122, 123 and 124 of a higher voltage rating. Each of the transistors 111, 112, 113 and 114 of the lower voltage rating may be controlled externally by switching signals 141, 142, 143 and 144 respectively all based on one external clock signal, wherein each of the switching signals 141, 142, 143 and 144 may comprise an appropriate relative phase shift and amplitude inversion with respect to each other to achieve the desired functionality of the inverted rectifier 100 to convert the DC-voltage applied between the VDD and VSS node of the inverted rectifier 100 to an AC-voltage between the output nodes Q1 and Q2 using the structure of a full-bridge converter.

An advantage of using the transistors 111, 112, 113 and 114 of the lower voltage rating is that, due to their above-describe lower switching energy to perform a switching operation, less power is needed to drive the transistors 111, 112, 113 and 114 of the lower voltage rating. As a result, the total degree of efficiency in converting DC-power to AC-power by the inverted rectifier 100 is increased. In this context, it becomes clear that the invention is not limited to using transistors with lower voltage rating as the transistors 111, 112, 113 and 114. Rather, the transistors 111, 112, 113 and 114 could be simply smaller transistors than transistors 121, 122, 123 and 124 or generally transistors that may perform a switching operation using a first, lower level of switching energy compared to a second, higher level of switching energy of their respectively cascaded transistors 121, 122, 123 and 124.

Moreover, other than in typically cascode circuits, in which the gates of the transistors with higher voltage rating are connected to a DC-voltage, as shown in FIG. 1, the gates of the transistors 121 and 122 of the second class of the first half-bridge 105 may be cross-coupled with a series coupling node between the transistors 123 and 124 of the second class of the second half-bridge 106. Correspondingly, the gates of the transistors 123 and 124 of the second class of the second half-bridge 106 may be cross-coupled with a series coupling node between the transistors 121 and 122 of the second class of the first half-bridge 105. In sum, the cross-coupling configuration may be similar to that of an LC-oscillator.

This cross-coupling of the first and second common gate nodes 125 and 126 of the transistors 121, 122 as well as 123, 124 of the second class to the output nodes Q1 and Q2 and the inductive load character of the coreless transformer 10 coupled between the outputs Q1 and Q2 may be the basis of a further advantage of the inverted rectifier 100. In this regard, a reactive power for driving the transistors 121 and 122 cross-coupled to transistors 123 and 124 may be provided by a reactive power of an inductive load connected between the output nodes Q1 and Q2 of the half-bridges 106 and 105 of the full-bridge inverted rectifier 100. In other words, the transistors 111, 112, 113 and 114 of the higher voltage rating may be driven by a reactive current of the load circuit such as the coreless transformer 10. As a result, again less active power is dissipated so that the total degree of efficiency in converting DC-power to AC-power by the inverted rectifier 100 may be further increased.

In the embodiment of the inverted rectifier 100 in FIG. 1, the transistors 111, 112, 113 and 114 of the lower voltage rating may be used to externally control an interruption of the current flowing through the cross-coupled transistors 121, 122, 123 and 124 of the higher voltage rating forming an oscillator circuit.

In the embodiment of FIG. 1, it is possible that the DC-voltage applied to the full-bridge inverted rectifier 100 via the supply nodes VDD and VSS may be higher than the maximum voltage rating of the transistors 111, 112, 113, 114 of the first, lower voltage rating. In this regard, one may be reminded that during that half cycle of the conversion of the DC-voltage to an AC-voltage during which a corresponding one of the transistors 111, 112, 113, 114 of the lower voltage rating is switched off, the corresponding one of the transistors 121, 122, 123, 124 of the higher voltage rating, which configured in series that transistor of the lower voltage rating, is also switched off due to the voltage conditions at the output nodes of the inverted rectifier 100. As a result, any one of the transistors 111, 112, 113, 114 of the lower voltage rating only "absorbs" some voltage during a commutation phase of the respective one of the bridge sections 101, 102, 103 and 104. In an embodiment, the maximum of the occurring reverse biasing voltage may amount to only a fraction of the DC- or supply voltage (such as ⅓). For that reason, it may be possible to use small, fast switching transistors as the transistors 111, 112, 113, 114 that exhibit a maximum voltage rating which is lower than the DC-voltage.

Figure 2A:
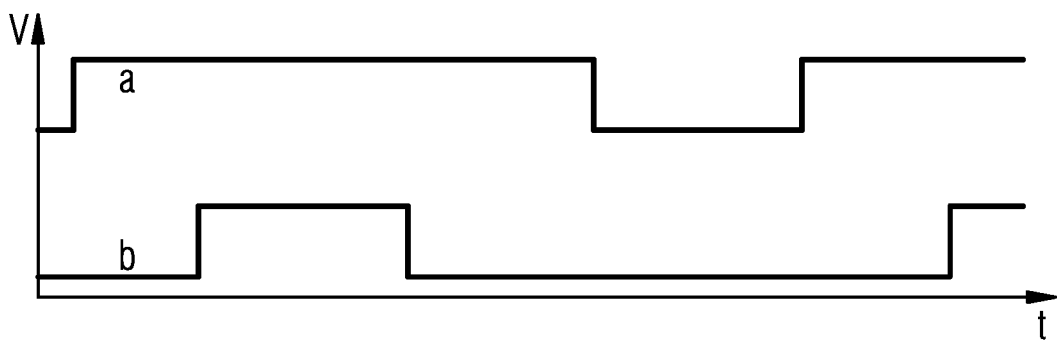
FIGS. 2a and 2b are timing diagrams that show one example of external control signal sequences that may be applied for externally controlling the operation of the inverted rectifier in the embodiment according to FIG. 1.
Figure 2B:
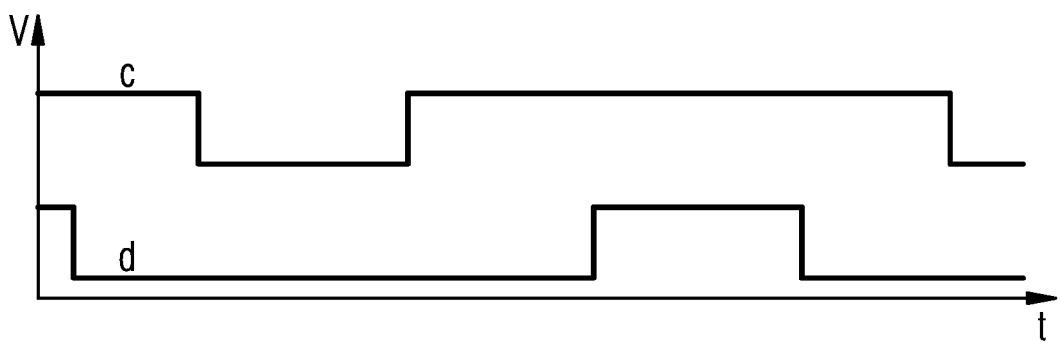

FIGS. 2a and 2b show an example for the four external switching signal sequences 144, 143, 141 and 142 as shown in FIG. 1 that may be applied to the transistors 114, 113, 111 and 112 of the lower voltage rating at nodes a, b, c and d respectively. For clarity reasons, the switching signal sequences for the transistors of the lower voltage rating are shown in two diagrams, wherein the switching signal sequences are designated with the same references a, b, c and d as the corresponding gate nodes of the transistors 114, 113, 111 and 112 of the lower voltage respectively.

From a comparison of switching signal sequences b and c, it becomes clear that, for an ideal operation of the inverted rectifier 100, diagonally opposite bridge sections such as third bridge section 103 and first bridge section 101 should be switched off by the switching signal sequences b and c simultaneously. An example for such a synchronized switching instant may be found at the first falling edge of switching signal b that may switch off the third bridge section 103 through the n-channel transistor 113 of the lower voltage rating. In the example of FIGS. 2a and 2b, the first falling edge of switching signal b occurs simultaneously with a first rising edge of switching signal c that may switch off the first bridge section 101 through the p-channel transistor 111 of the lower voltage rating.

Similarly, a further synchronized switching instant may be found at the first falling edge of switching signal d that may switch off the second bridge section 102 through the n-channel transistor 112 of the lower voltage rating. Also here, the first falling edge of switching signal d occurs simultaneously with a first rising edge of switching signal a that may switch off the fourth bridge section 104 through the p-channel transistor 114 of the lower voltage rating.

Figure 2C:
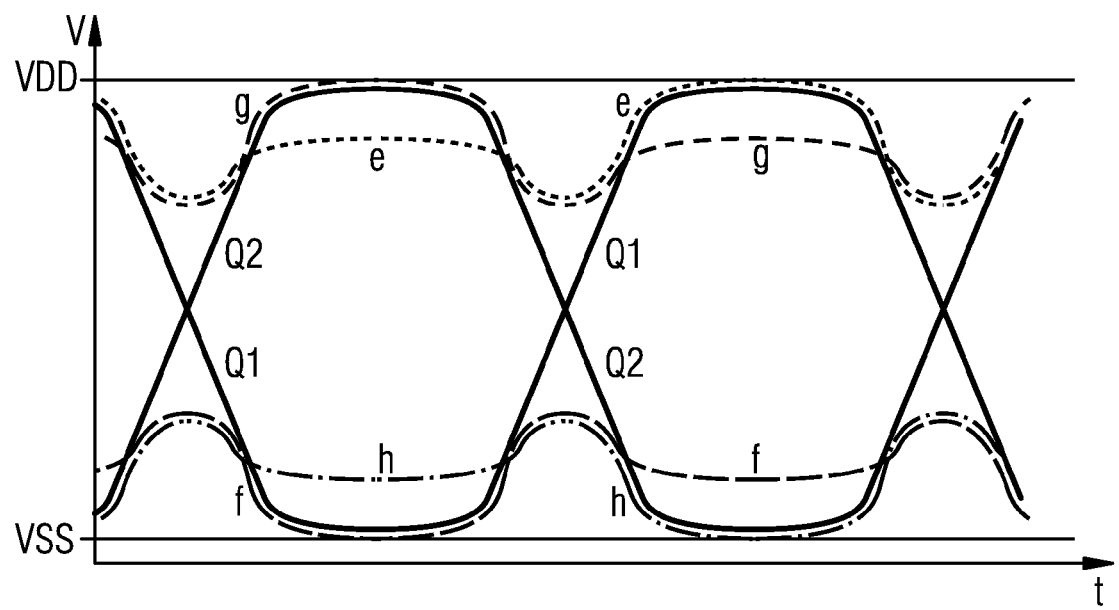
FIG. 2c is a diagram showing the resulting signal sequences at nodes as designated in the embodiment of FIG. 1 such as, inter alia, the output nodes or nodes Q1 and Q2 of the inverted rectifier according to FIG. 1.

Moreover, in FIG. 2c, a further diagram is shown, depicting signal sequences e, f, g, h, Q1 and Q2 that are designated with the same references as the corresponding nodes in the inverted rectifier 100 of FIG. 1. The signal sequences e, f, g, h, Q1 and Q2 may result at the corresponding nodes in response to the switching signal sequences a, b, c and d in FIGS. 2a and 2b. Please note that the maximum voltage at the nodes f and h and the minimum voltage at the nodes e and g referred to VDD are only a fraction of the level of VDD, while Q1 and Q2 excurse the full swing from VSS to VDD.

Figure 3:
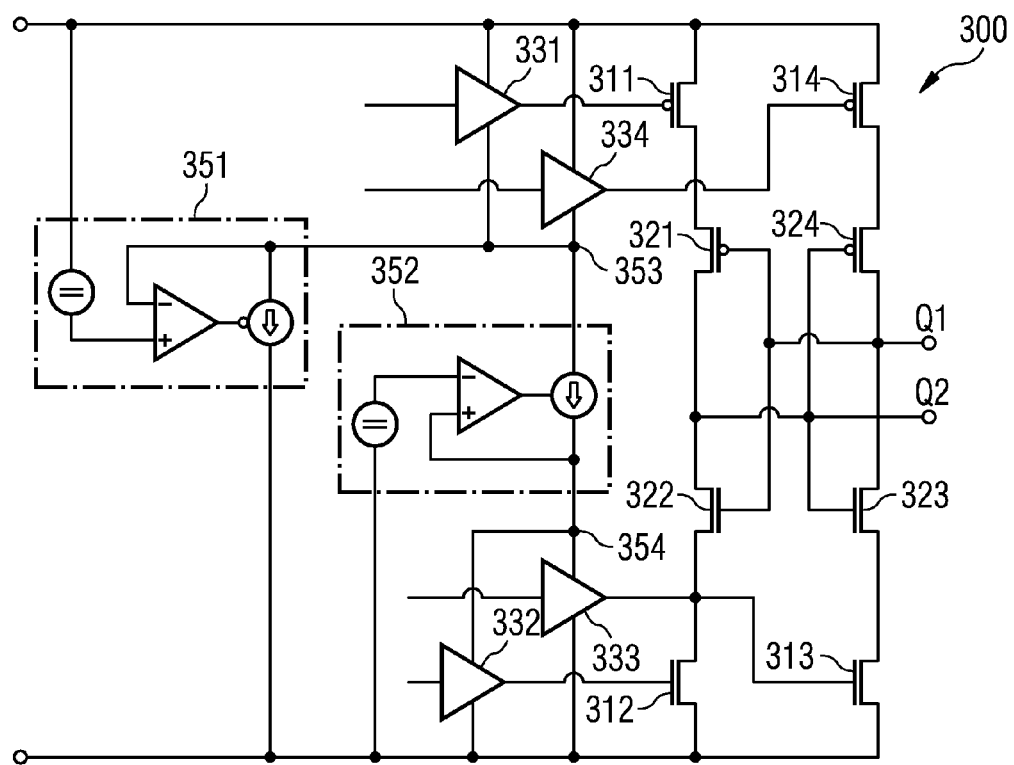
FIG. 3 shows a schematic of a full-bridge inverted rectifier according to a further embodiment, further showing two pairs of drivers for externally controlling the operation of the inverted rectifier, as well as two voltage controllers for controlling the supply voltages of the two pairs of drivers.

FIG. 3 shows a schematic of a full-bridge inverted rectifier 300 according to a further embodiment for providing synchronized switching instants for the p-channel transistors 311 and 314 compared to n-channel transistors 313 and 312 respectively by controlling the supply voltages of the respective p-channel-drivers 331 and 334 and n-channel drivers 333 and 332 through independent voltage controllers 351 and 352. As shown, the structure of this inverted rectifier 300 may correspond to the structure of the inverted rectifier 100 in FIG. 1 wherein corresponding items have been designated with reference numbers that exhibit the same two rightmost digits.

Apart from the identical structure of the inverted rectifier 300 itself compared to the inverted rectifier 100 in FIG. 1, the embodiment in FIG. 3 further shows the first, upper pair of p-channel-drivers 331 and 334 that may respectively drive the p-channel transistors 311 and 314 of the lower voltage rating of the inverted rectifier 300, and the second, lower pair of n-channel-drivers 332 and 333 that may respectively drive the n-channel transistors 312 and 313 of the lower voltage rating of the inverted rectifier 300. As shown, a first voltage controller 351 may provide the p-channel-drivers 331 and 334 with a first controlled supply voltage. Similarly, a second voltage controller 352 may provide the n-channel-drivers 332 and 333 with a second controlled supply voltage. Controlling the first and the second supply voltages independently may provide for appropriate propagation delays through the p-channel-drivers 331 and 334 compared to the n-channel-drivers 332 and 333 to ultimately achieve synchronous switching operations of the p-channel transistors 311 and 314 compared to the n-channel transistors 313 and 312 respectively.

In embodiments, the supplies for the p-channel-drivers 331 and 334 and for the n-channel-drivers 332 and 333 may be coupled in series in case the voltages for driving the transistors 311, 314, 312 and 313 of the lower voltage rating is smaller than half of the supply voltage of the inverted rectifier 300. Usually, the p-channel transistors 311 and 314 comprise bigger gate areas so that the load current of the first voltage controller 351 for the p-channel-drivers 331 and 334 is typically larger that the load current of the second voltage controller 352 for the n-channel-drivers 332 and 333.

Correspondingly, as in the embodiment in FIG. 3, the second voltage controller 352 for the n-channel-drivers 332 and 333 may be coupled with its input to a supply node 353 for the p-channel-drivers 331 and 334, and hence, may co-supply the p-channel-drivers 331 and 334 with its load current. In this case, only the difference between the load current of the p-channel-drivers 331 and 334 and that of the n-channel-drivers 332 and 333 may be needed to be supplied by the further first voltage controller 351 for the p-channel-drivers 331 and 334.

In other words, the second voltage controller 352 may be coupled between a supply node 353 of the p-channel-drivers 331 and 334 and a supply node 354 of the n-channel-drivers 332 and 333 to not only supply the n-channel-drivers 332 and 333 but also partly the p-channel-drivers 331 and 334 with its load current. Based on this type of interconnecting the first voltage controller 351 and the second voltage controller 352, the total current consumption of the inverted rectifier 300 may be reduced, which is reflected in a further increased total degree of efficiency of the inverted rectifier 300.

Figure 4:
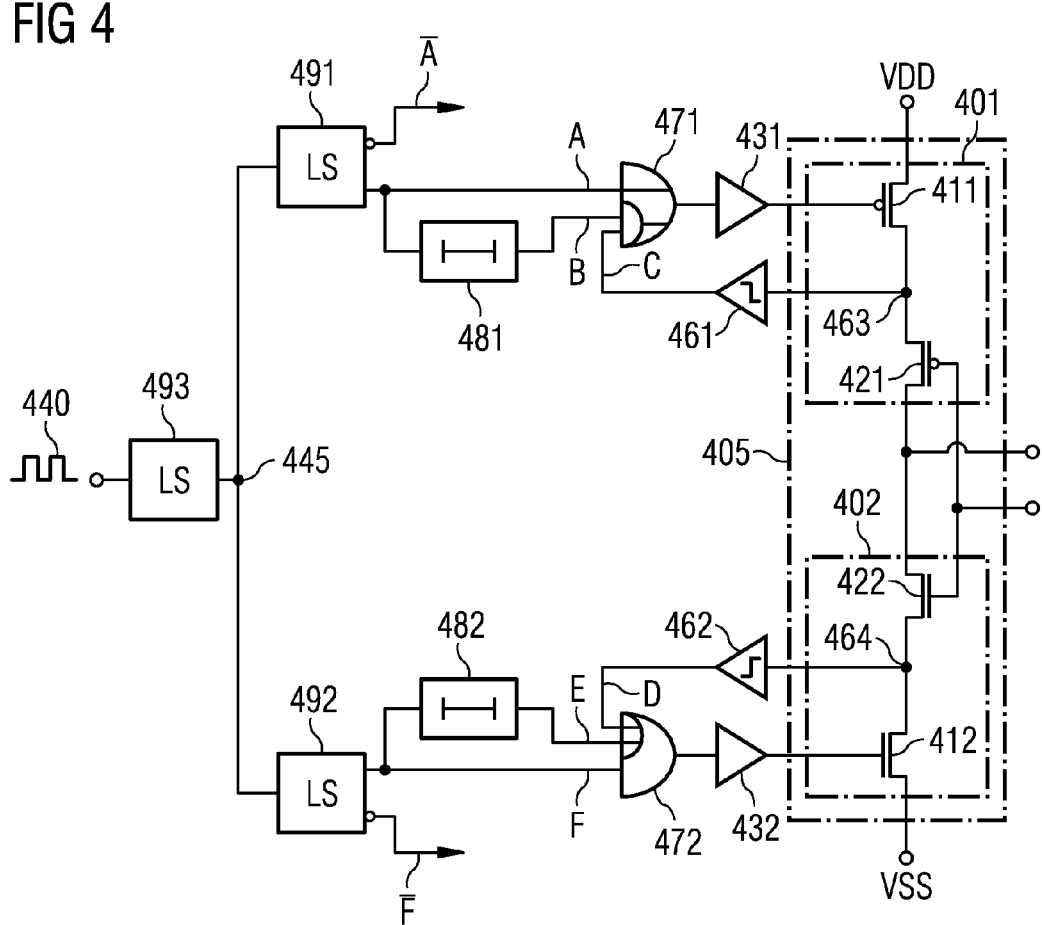
FIG. 4 is a schematic diagram that shows one example of a half-bridge portion of a full-bridge inverted rectifier and one example of a control circuit configured to control the rectifier.

In some examples, one may advantageously operate a high-frequency full-bridge inverted rectifier such that its bridge sections are switched on at instances, at which the voltages across that respective bridge section is low. FIG. 4 shows a schematic of a first half-bridge 405 of a full-bridge inverted rectifier 400 according to a further embodiment for operating the inverted rectifier 400 such that any bridge section is switched on at instances, at which the voltages across that respective bridge section is low. This type of operating an inverted rectifier is usually referred to as near zero voltage switching or near-ZVS.

As shown in FIG. 4, the structure of the first half-bridge 405 of the inverted rectifier 400 may correspond to the structure of the first half-bridge 105 of the inverted rectifier 100 in FIG. 1 wherein corresponding items have been designated with reference numbers that exhibit the same two rightmost digits.

For the purpose of operating the inverted rectifier 400 in the near-ZVS operation mode, each of the bridge sections 401 and 402 of each half-bridge of the inverted rectifier 400 may be coupled to one of a plurality of voltage detectors 461 and 462 respectively that enables switching on the respective one of the bridge sections 401 and 402 only in case the voltage across the respective one of the bridge sections 401 and 402 has dropped below a predetermined threshold voltage.

As in the embodiment in FIG. 4, a first voltage detector 461 may be coupled to a series coupling node 463 between the p-channel transistor 411 with lower voltage rating and the p-channel transistor 421 with higher voltage rating of the first, upper bridge section 401. Accordingly, a second voltage detector 462 may be coupled to a series coupling node 464 between the n-channel transistor 412 with lower voltage rating and the n-channel transistor 422 with higher voltage rating of the second, lower bridge section 402.

In embodiments with the above-mentioned coupling of the voltage detectors to the inverted rectifier, each of the plurality of voltage detectors 461 and 462 associated with all bridge sections may only comprise components of the lower voltage rating to achieve very short signal delays in enabling switching on the respective one of the bridge sections dependent on the voltages detected by the respective one of the plurality of voltage detectors.

Advantageously, any one of the bridge sections of the full-bridge the inverted rectifier 400 may be switched on after a predetermined delay irrespective of whether the voltage across the respective bridge section has dropped below the predetermined threshold voltage to enable to start the operation of the inverted rectifier 400 in case of no load current.

In the embodiment of FIG. 4, the above-mentioned functionality may be achieved with complex logic gates 471 and 472 that may combine a plurality of input signals for each bridge section to produce an output signal that may actually control whether the respective bridge section is switched on via the respective driver.

In case of the upper bridge section 401 in FIG. 4, the corresponding first complex logic gate 471 combines the switching signal A, with a switching signal B that corresponds to the switching signal A delayed by the delay element 481, and with an output signal C of the first voltage detector 461 according to the logic function A (B C) to yield an output signal of the first complex logic gate 471 that may drive the p-channel driver 431. In this regard, the switching signal A may be enabled to drive the p-channel driver 431 in case signal C is true when the first voltage detector 461 has detected that the voltage across the first bridge section 401 has dropped below the predetermined threshold voltage or after the switching A signal has passed through the first delay element 481 and the logic combination of switching signal A and its delayed instance B causes that a switching signal corresponding to the switching signal A is passed on to the input of driver 431 irrespective of whether the voltage across the first bridge section 401 has dropped below the predetermined threshold voltage.

Furthermore, in case of the lower bridge section 402 in FIG. 4, the corresponding second complex logic gate 472 combines the switching signal F, with a switching signal E that corresponds to the switching signal F delayed by the delay element 482, and with an output signal D of the second voltage detector 462 according to the logic function (D E) F to yield an output signal of the second complex logic gate 472 that may drive the n-channel driver 432. In this regard, the switching signal F may be enabled to drive the n-channel driver 432 in case signal D is true when the second voltage detector 462 has detected that the voltage across the second bridge section 402 has dropped below the predetermined threshold voltage or after the switching signal F has passed through the second delay element 482 and the logic combination of switching signal F and its delayed instance E causes that a switching signal corresponding to the switching signal F is passed on to the input of driver 432 irrespective of whether the voltage across the second bridge section 402 has dropped below the predetermined threshold voltage.

For a near-ZVS operation of a high-frequency inverted rectifier, respectively opposite bridge sections of the full-bridge inverted rectifier should be switched off as synchronously as possible. This holds particularly in conjunction with air-core coil based transformers with low inductance. Otherwise, one of the two half-bridge would commutate first and the magnetic field in the air-core coil based transformer would reduce before the second half-bridge is fully commutated. In such a case, one bridge section might quickly reach its pre-condition to be switched on of a very low voltage, the other bridge section, however, might not reach the its pre-condition to be switched on at all.

For this reason, a first level shifter 493 may be provided to convert an external clock signal 440, on which the externally controlled switching of the inverted rectifier 400 may be based, to voltage levels that lie symmetrical with respect to the supply voltage levels VDD and VSS of the inverted rectifier 400 to yield a level shifted clock signal 445. Moreover, as in the case of the embodiment in FIG. 4, a second level shifter 491 may be provided to convert the level shifted clock signal 445 to the switching signal A for the upper bridge section 401 of the first half-bridge 405. Furthermore, a third level shifter 492 may be provided to convert the level shifted clock signal 445 to the switching signal F for the lower bridge section 402 of the first half-bridge 405.

Based on this type of interconnection, the signal paths to provide external switching signals to drive the upper bridge section 401 and the lower bridge section 402 comprise the same number of level shifters. As a result, any imbalances in the signal paths to drive the upper bridge section 401 and the lower bridge section 402 that might lead to asynchronous switching operation of diagonally opposite bridge sections may be avoided. In sum, with regard to the voltage detectors, FIG. 5 depicts a first embodiment comprising a first set of control loop and associated circuits for appropriately synchronizing instances in time, at which the bridge sections of a full-bridge inverted rectifier are switched off with respect to each other.

For the reason of clarity, FIG. 4 only depicts the first half-bridge 405 of the full-bridge inverter rectifier 400 and its associated circuits such as the delay elements 481 and 482, the complex logic gates 471 and 472 as well as the voltage detectors 461 and 462 to ultimately generate the switching signals driving the p-channel driver 431 and the n-channel driver 432 respectively based on the external clock signal 440. Of course, the second half-bridge (not shown) of the full-bridge inverter rectifier 400 may comprise corresponding associated circuits such as corresponding delay elements, corresponding complex logic gates as well as corresponding voltage detectors for the generation of the switching signals based on the external clock signal 440. In an embodiment, the corresponding associated circuits may be connected to complementary outputs and of the second level shifter 491 and the third level shifter 492 respectively.

Figure 5:
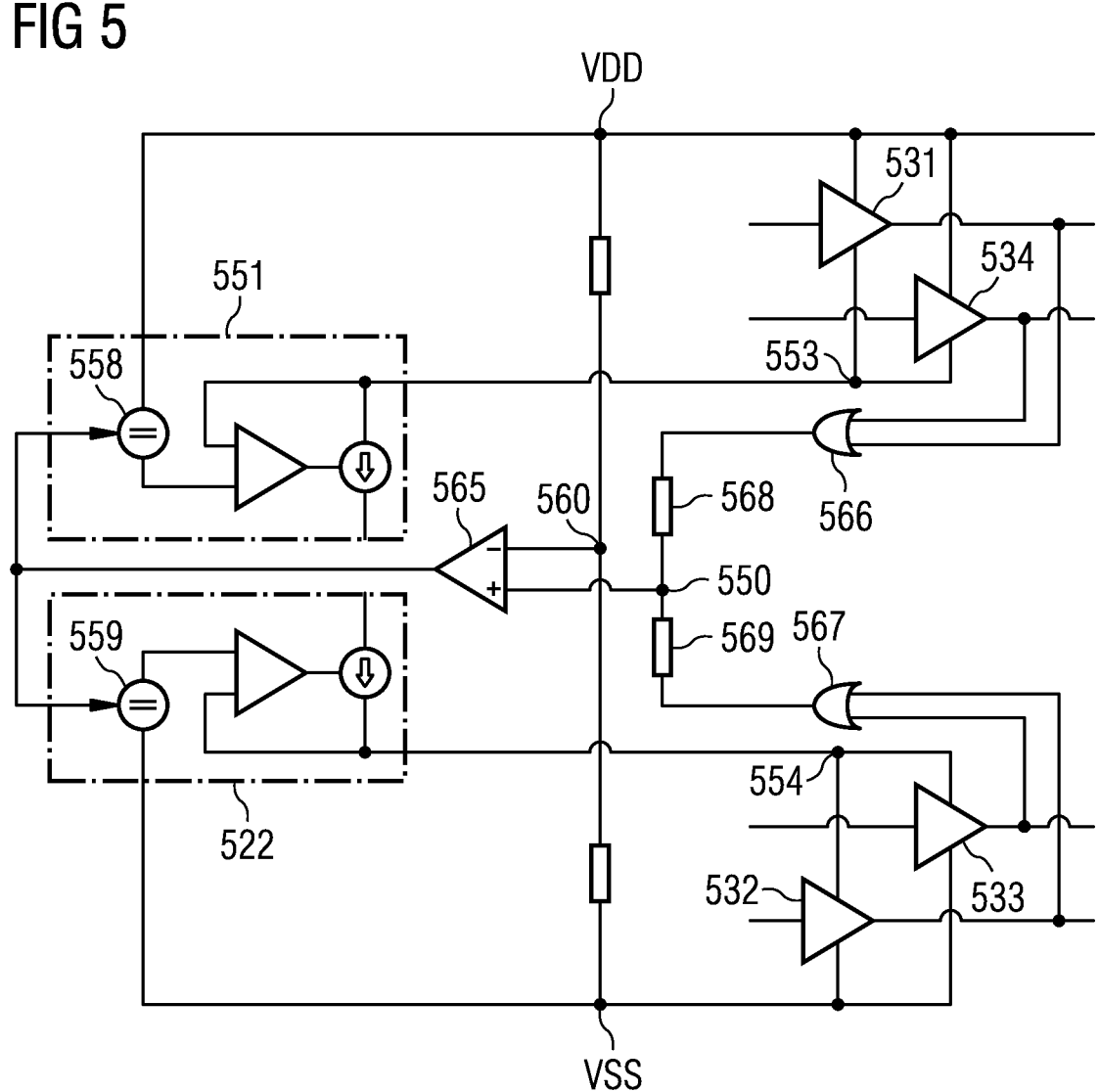
FIG. 5 shows an embodiment of a control circuit that may be used to control a full-bridge inverted rectifier, for example the full-bridge inverter rectifier depicted in FIG. 1.

FIG. 5 shows an embodiment of a further system for synchronizing the switching instants of the bridge sections of a full-bridge inverted rectifier according to the one FIG. 1. As shown in FIG. 5, coupling of the pair of p-channel drivers 531 and 534 as well as the pair of n-channel drivers 532 and 533 to the according inverted rectifier (not shown) may correspond to the coupling as shown in FIG. 3 wherein corresponding items have been designated with reference numbers that exhibit the same two rightmost digits.

Generally, control circuits and methods may be implemented that control that diagonally opposite bridge sections such as third bridge section 103 and first bridge section 101 as well as the second bridge section 102 and fourth bridge section 104 in the full-bridge inverted rectifier 100 are switched off simultaneously.

In this regard, an embodiment may comprise a method for synchronizing switching instants of a full-bridge inverted rectifier by comparing a first switching instant of the first bridge section 101 in the first half-bridge 105 of the full-bridge inverter 100 with a second switching instant of the third bridge section 103 in second half-bridge 106 of the full-bridge inverter 100 to determine any difference between first switching instant and the second switching instant as a first switching error. With regard to the embodiment of the full-bridge inverter 100 as shown in FIG. 1, the third bridge section 103 in the second half-bridge 106 lies opposite to the first bridge section 101 in the first half-bridge 105.

A further step of the method may comprise comparing a third switching instant of the second bridge section 102 in the first half-bridge 105 of the full-bridge inverter 100 with a fourth switching instant of the fourth bridge section 104 in the second half-bridge 106 of the full-bridge inverter 100 to determine any difference between third switching instant and the fourth switching instant as a second switching error. Again with respect to FIG. 1, the fourth bridge section 104 of the second half-bridge 106 lies opposite to the second bridge section 102 in the first half-bridge 105.

In a further step, the embodiment may comprise, dependent on an amount and sign of the first switching error and the second switching error, varying a delay of the first driver 531 driving an external switching of the first bridge section 101 with respect to a delay of a third driver 533 driving an external switching of the third bridge section 103 and varying a delay of a second driver 532 driving an external switching of the second bridge section 102 with respect to a delay of a fourth driver 534 driving an external switching of the fourth bridge section 104 such that the first switching error and the second switching error disappears.

Hence, generally, for an improved synchronization of the switching instants at which the bridge sections of a full-bridge inverted rectifier are switched off, at least one control circuit may be provided that may compare the instants at which the bridge sections of the full-bridge inverted rectifier are switched on and may vary at least one supply voltage of at least one of the drivers that drives one of the bridge sections in case of a deviation between the switching instants accordingly to reduce the deviation by varying the propagation delay of the at least one of the drivers. In this regard, the propagation delay of digital drivers and logic circuits strongly depends on their supply voltage. If the turn off instants are not synchronous, the transition times of Q1 and Q2 will differ much more than the deviation of the turn off instants. Therefore, comparing the turn on instants leads to a magnified comparison result with respect to comparing the turn off instants.

Thus, by increasing the supply voltage of one driver and reducing the supply voltage of another driver, the corresponding switching instants may easily be synchronized so that also the instants, at which the corresponding bridge sections are switched on, may easily be synchronized.

One embodiment of a circuit for the synchronization is shown in FIG. 5. This embodiment may compare a first time period during which the upper two bridge sections (e.g., the bridge sections 101 and 104 in FIG. 1) are switched off simultaneously with a second time period during which the lower two bridge sections (e.g., the bridge sections 102 and 103 in FIG. 1) are switched off simultaneously. These first and second time periods approximately correspond to the transition times of the output nodes of the full-bridge inverted rectifier from their low voltage level to their high voltage level or the transition times of the output nodes of the full-bridge inverted rectifier from their high voltage level to their low voltage level respectively.

Dependent on an amount and sign of a difference between the first time period and the second time period, a delay of first p-channel drivers 531 and 534 driving an external switching of the two upper bridge sections 101 and 104 with respect to a delay of second n-channel drivers 532 and 533 driving an external switching of the two lower bridge sections 102 and 103 is adjusted such that the difference between the first time period and the second time period disappears.

For the purpose of the above-mentioned comparison of the first time period with the second time period, the output of the first p-channel driver 531 and the output of the second p-channel driver 534 may be coupled to a logic AND-gate 566. Moreover, the output of the first n-channel driver 532 and the output of the second n-channel driver 533 may be coupled to a logic OR-gate 567. Furthermore, a comparing voltage may be provided at a comparing node 550 where a first resistance 568 at an output of the AND-gate 566 may be coupled to a second resistance 569 at an output of the OR-gate 567, wherein the comparing voltage is representative for the difference between the first time period and the second time period.

Moreover, as shown in FIG. 5, embodiments may comprise an operational amplifier 565 to compare the comparing voltage with a mid-level voltage in the middle between supply voltage levels VDD and VSS of the inverted rectifier 100 at a middle node 560 to control reference voltage levels 558 and 559 for voltage controllers 551 and 552 controlling the supply of the p-channel drivers 531 and 534 and the n-channel drivers 532 and 534 respectively.

In this embodiment, the comparing voltage being lower than the mid-level voltage may cause an increase in an output of a first one 551 the voltage controllers controlling the supply of the p-channel drivers 531 and 534 at a first supply node 553 which may reduce a signal propagation delay through the p-channel drivers 531 and 534. Further, this may cause a decrease in an output of a second one 552 of the voltage controllers controlling the supply of the n-channel drivers 532 and 533 at a second supply node 554 which may increase a signal propagation delay through the n-channel drivers 532 and 533.

Moreover, in the embodiment according to FIG. 5, the comparing voltage being higher than the mid-level voltage may cause to decrease an output of the first one 551 of the voltage controllers controlling the supply of the p-channel drivers 531 and 534 at the first supply node 553 which may increase the signal propagation delay through the p-channel drivers 531 and 534. Further, this may increase an output of the second one 552 of the voltage controllers controlling the supply of the n-channel drivers 532 and 533 at the second supply node 554 which may reduce the signal propagation delay through the n-channel drivers 532 and 533.

Hence, since the signals at the output of the AND-gate 566 and the output of the OR-gate 567 are complementary with respect to each other, they may be summed by means of the resistor network comprising the first resistance 568 and the second resistance 569. In case the above-mentioned first time period and the second time period last equally long, the voltage at the comparing node 550 will be substantially exactly in the middle between the supply voltage levels VDD and VSS. In case of deviations between the first time period and the second time, the voltage at the comparing node 550 will also deviate from the mid-voltage level between the supply voltage levels VDD and VSS, and the reference voltage levels 558 and 559 for the voltage controllers 551 and 552 controlling the supply of the p-channel drivers 531 and 534 and the n-channel drivers 532 and 534 respectively will be varied by the output of the comparator 565 in opposite directions.

For example, if the upper two bridge sections 101 and 104 are regularly switched off too late because the propagation delay of the p-channel drivers 531 and 534 for the p-channel transistors 101 and 104 may be somewhat longer as that of the n-channel drivers 532 and 533 for the n-channel transistors 102 and 103, the commutation from the upper bridge sections 101 and 104 to the lower bridge sections 102 and 103 will take longer than the other way round, e.g., from the lower to the upper bridge sections 101, 104.

As a result, the upper bridge sections 101 and 104 will be switched on earlier via the voltage detectors than the lower bridge sections 102 and 103. Because of that, the upper bridge sections 101 and 104 will for a shorter period of time be switched off simultaneously than the lower bridge sections 102 and 103. Consequently, the voltage at the comparing node 550 will be somewhat reduced. Via the comparator 565, the absolute value of the output voltage of the first voltage controller 551 for the p-channel drivers 531 and 534 will be increased while the absolute value of the output voltage of the second voltage controller 552 for the n-channel drivers 532 and 533 will be reduced until the upper bridge sections 101 and 104 and the lower bridge sections 102 and 103 are switched off simultaneously for a substantial equal period of time again.

Figure 6:
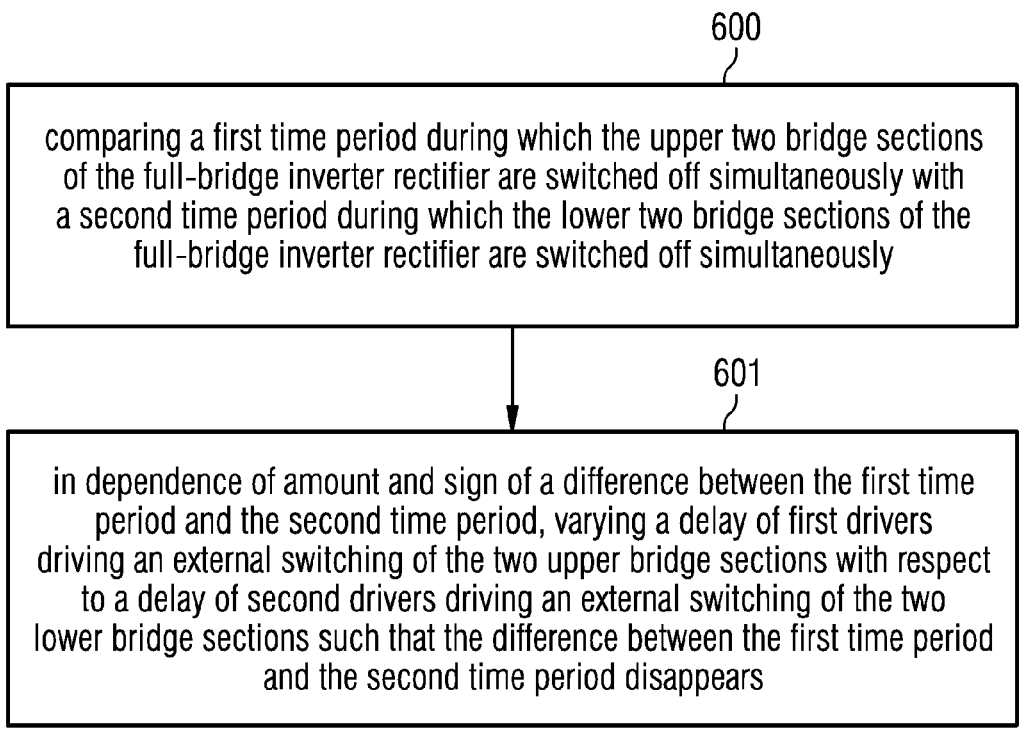
FIG. 6 shows one example of a method for controlling a full-bridge inverted rectifier according to an embodiment.

FIG. 6 shows a flow diagram of a method for synchronizing the switching instants of a full-bridge inverter rectifier according to an embodiment. This method may comprise comparing 600 a first time period during which the upper two bridge sections of the full-bridge inverter rectifier are switched off simultaneously with a second time period during which the lower two bridge sections of the full-bridge inverter rectifier are switched off simultaneously.

The method may further comprise, dependent on an amount and sign of a difference between the first time period and the second time period, varying 601 a delay of first drivers driving an external switching of the two upper bridge sections with respect to a delay of second drivers driving an external switching of the two lower bridge sections such that the difference between the first time period and the second time period disappears.

Figure 7:
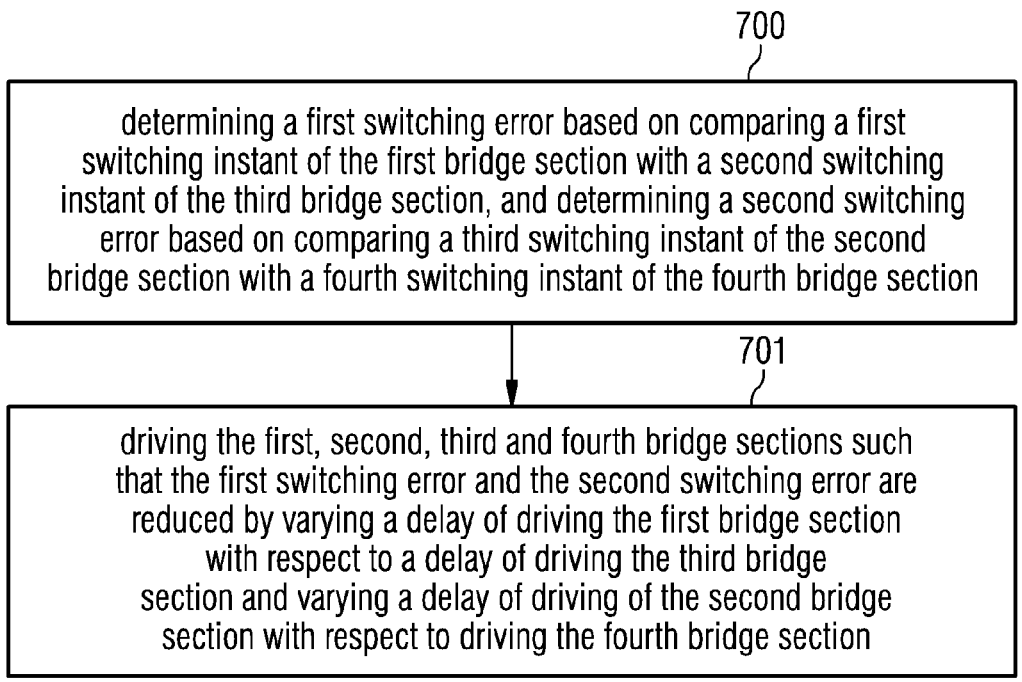
FIG. 7 shows one example of a method to control a full-bridge device according to an embodiment.

FIG. 7 shows a flow diagram of a method to control a full-bridge device according to an embodiment. The full-bridge device includes at least first, second, third, and fourth bridge sections. The method comprises determining 700 a first switching error based on comparing a first switching instant of the first bridge section with a second switching instant of the third bridge section, and determining a second switching error based on comparing a third switching instant of the second bridge section with a fourth switching instant of the fourth bridge section. Further, the method comprises driving 701 the first, second, third and fourth bridge sections such that the first switching error and the second switching error are reduced by varying a delay of driving the first bridge section with respect to a delay of driving the third bridge section and varying a delay of driving of the second bridge section with respect to driving the fourth bridge section.

With respect to the above-described embodiments which relate to the Figures, it is emphasized that the embodiments basically served to increase the comprehensibility. In addition to that, the following further embodiments try to illustrate a more general concept. However, also the following embodiments are not to be taken in a limiting sense. Rather, as expressed before, the scope of the present invention is defined by the appended claims.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A device, comprising:
 a full-bridge configured to convert a direct current (DC) voltage to an alternating current (AC) voltage, wherein the full-bridge comprises at least first, second, third and fourth bridge sections, and wherein each of the first, second, third and fourth bridge sections comprises:
  a switch of a first type configured to switch in response to a first voltage level and a switch of a second type configured to switch in response to a second voltage level different than the first voltage level; and
  wherein the switch of the second type is configured to be driven at a control terminal using an inductive current of a load coupled to an output of the full-bridge.

2. The device of claim 1, further comprising at least one driver configured to drive each switch of the first type.

3. The device of claim 1, wherein the switch of the first type is coupled in series with the switch of the second type.

4. The device of claim 1, wherein the second voltage level comprises a DC supply voltage of the full-bridge and wherein the first voltage level is less than the DC supply voltage of the full-bridge.

5. The device of claim 1, wherein each of the switches of the first type is driven by a respective switching signal that externally controls switching operations of a respective one of the first, second, third and fourth bridge sections.

6. The device of claim 1, wherein the switches of the first type comprise transistors of a first, lower voltage class and wherein the switches of the second type comprise transistors of a second, higher voltage class.

7. The device of claim 6, wherein the transistors of the first, lower voltage class comprise logic transistors of an integrated circuit technology and wherein the transistors of the second, higher voltage class comprise I/O transistors of the integrated circuit technology.

8. The device of claim 1, wherein:
 the switches of the first type comprise transistors of a first size and/or transistors of a first switching speed and/or transistors of a first gate charge and/or transistors of a first gate energy; and the switches of the second type comprise transistors of a second size and/or transistors of a second switching speed and/or transistors of a second gate charge and/or transistors of a second gate energy.

9. The device of claim 1, wherein:
the switches of the first type of the first and the fourth bridge sections each comprise a p-channel transistor, and the switches of the second type of the first and the fourth bridge sections each comprise a p-channel transistor; and
the switches of the first type of the second and the third bridge sections each comprise an n-channel transistor and the switches of the second type of the second and the third bridge sections each comprise an n-channel transistor.

10. The device of claim 9, wherein:
a gate of the p-channel transistors of the first type of the first and the fourth bridge sections are each coupled to a respective p-channel driver;
a gate of the n-channel transistors of the first type of the second and the third bridge sections are each coupled to a respective n-channel driver; and
each one of the p-channel drivers and the n-channel drivers is driven by a respective switching signal based on an external clock signal.

11. The device of claim 10, further comprising a voltage controller for the n-channel drivers coupled between the p-channel drivers and the n-channel drivers to partly supply the p-channel drivers.

12. The device of claim 1, wherein:
the direct current (DC) voltage is present between a first input terminal and a second input terminal;
the output of the full-bridge comprises a first output terminal and a second output terminal;
the first bridge section has a conduction path through the switch of the first type and the switch of the second type from the first input terminal to the second output terminal;
the second bridge section has a conduction path through the switch of the first type and the switch of the second type from the second input terminal to the second output terminal;
the third bridge section has a conduction path through the switch of the first type and the switch of the second type from the second input terminal to the first output terminal;
the fourth bridge section has a conduction path through the switch of the first type and the switch of the second type from the first input terminal to the first output terminal;
the control terminal of the switch of the second type of the first bridge section is coupled to the first output terminal;
the control terminal of the switch of the second type of the second bridge section is coupled to the first output terminal;
the control terminal of the switch of the second type of the third bridge section is coupled to the second output terminal; and
the control terminal of the switch of the second type of the fourth bridge section is coupled to the second output terminal.

13. A method for converting a direct current (DC) voltage to an alternating current (AC) voltage, the method comprising:
driving a full-bridge that comprises at least first, second, third and fourth bridge sections, and wherein each of the first, second, third and fourth bridge sections comprises:
a switch of a first type configured to switch in response to a first voltage level; and
a switch of a second type configured to switch in response to a second voltage level different than the first voltage level; and
wherein driving the full-bridge comprises driving a control terminal of the switch of the second type of each of the first, second, third and fourth bridge sections using an inductive current of a load coupled to an output of the full-bridge.

14. The method of claim 13, further comprising synchronizing switching instants of the full-bridge by using a voltage detector for each of the first, second, third and fourth bridge sections to detect a voltage across each of the first, second, third and fourth bridge sections respectively, wherein each of the first, second, third and fourth bridge sections is controlled to switch on only after the voltage across a respective one of the first, second, third and fourth bridge sections has dropped below a predetermined threshold.

15. The method of claim 14, wherein:
the switches of the first type of the first and the fourth bridge sections each comprise a p-channel transistor and the switches of the second type of the first and the fourth bridge sections each comprise a p-channel transistor; and
the switches of the first type of the second and the third bridge sections each comprise an n-channel transistor and the switches of the second type of the second and the third bridge sections each comprise an n-channel transistor.

16. The method of claim 15, further comprising:
driving each of the p-channel transistors and n-channel transistors of the first type with a respective switching signal based on an external clock signal, wherein the respective switching signal externally controls switching operations of a respective one of the first, second, third and fourth bridge sections; and
using a first level shifter to convert the external clock signal to a converted clock signal at voltage levels that lie symmetrical with respect to supply voltage levels of the full-bridge;
wherein at least one second level shifter to convert the converted clock signal to first driving signals for p-channel drivers drives the p-channel transistors of the first type respectively; and
wherein at least one third level shifter to convert the converted clock signal to second driving signals for n-channel drivers driving the n-channel transistors of the first type respectively.

17. A method for control of a full-bridge device that includes at least first, second, third, and fourth bridge sections, the method comprising:
determining a first switching error based on comparing a first switching instant of the first bridge section with a second switching instant of the third bridge section;
determining a second switching error based on comparing a third switching instant of the second bridge section with a fourth switching instant of the fourth bridge section; and
driving the first, second, third and fourth bridge sections such that the first switching error and the second switching error are reduced by varying a delay of driving the first bridge section with respect to a delay of driving the third bridge section and varying a delay of driving the second bridge section with respect to driving the fourth bridge section.

18. The method of claim 17, wherein driving the first, second, third and fourth bridge sections such that the first switching error and the second switching error are reduced comprises:
driving the first, second, third and fourth bridge sections to reduce the first switching error and the second switching error based on one or more of an amount and a polarity of the first switching error and the second switching error.

19. The method of claim 17, wherein driving the first, second, third and fourth bridge sections such that the first switching error and the second switching error are reduced comprises:
varying a first supply voltage supplying drivers for switching the first and fourth bridge section in opposite direction as a second supply voltage supplying drivers for switching the second and third bridge section.

20. The method of claim 17, wherein each of the first, second, third, and fourth bridge sections comprises a switch of a first type configured to switch in response to a first voltage level and a switch of a second type configured to switch in response to a second voltage level different than the first voltage level, and wherein driving the first, second, third and fourth bridge sections such that the first switching error and the second switching error are reduced comprises:
driving the switch of the first type of each of the first, second, third, and fourth bridge sections.

21. The method of claim 20, further comprising, for each bridge section, driving the switch of the second type using an inductive current of a load coupled to an output of the full-bridge device.

22. The method of claim 17, further comprising:
determining a difference between the first switching error and the second switching error; and
comparing the determined difference to a threshold.

23. The method of claim 22, wherein determining the difference between the first switching error and the second switching error comprises determining a comparing voltage that represents the difference; and
wherein comparing the determined difference to a threshold comprises comparing the comparing voltage to a reference voltage.

24. The method of claim 23, wherein the reference voltage comprises a voltage level that is substantially half of a DC supply voltage of the full-bridge device.

25. The method of claim 17, wherein driving the first, second, third and fourth bridge sections such that the first switching error and the second switching error are reduced comprises:
driving the first, second, third and fourth bridge sections to eliminate the first switching error and the second switching error.

26. A device configured to control a full-bridge device that includes at least first, second, third, and fourth bridge sections, wherein the device is configured to:
determine a first switching error based on comparing a first switching instant of the first bridge section with a second switching instant of the third bridge section;
determine a second switching error based on comparing a third switching instant of the second bridge section with a fourth switching instant of the fourth bridge section; and
drive the first, second, third and fourth bridge sections to reduce the first switching error and the second switching error by varying a delay of driving the first bridge section with respect to a delay of driving the third bridge section and varying a delay of driving of the second bridge section with respect to driving the fourth bridge section.

27. The device of claim 26, wherein the device is configured to drive the first, second, third and fourth bridge sections to reduce the first switching error and the second switching error based on one or more of an amount and a polarity of the first switching error and the second switching error.

28. The device of claim 26, wherein the device is configured to drive the first, second, third and fourth bridge sections to eliminate the first switching error and the second switching error.

29. A full-bridge converter comprising:
a first input terminal;
a second input terminal;
a first output terminal;
a second output terminal;
a first transistor having a first conductivity type, wherein the first transistor has a first conduction terminal coupled to the first input terminal;
a second transistor having the first conductivity type, wherein
the second transistor has a first conduction terminal coupled to a second conduction terminal of the first transistor,
the second transistor has a second conduction terminal coupled to the second output terminal, and
the second transistor has a control terminal coupled to the first output terminal;
a third transistor having a second conductivity type, wherein the third transistor has a first conduction terminal coupled to the second input terminal;
a fourth transistor having the second conductivity type, wherein
the fourth transistor has a first conduction terminal coupled to a second conduction terminal of the third transistor,
the fourth transistor has a second conduction terminal coupled to the second output terminal, and
the fourth transistor has a control terminal coupled to the first output terminal;
a fifth transistor having the first conductivity type, wherein the fifth transistor has a first conduction terminal coupled to the first input terminal;
a sixth transistor having the first conductivity type, wherein
the sixth transistor has a first conduction terminal coupled to a second conduction terminal of the fifth transistor,
the sixth transistor has a second conduction terminal coupled to the first output terminal, and
the sixth transistor has a control terminal coupled to the second output terminal;
a seventh transistor having the second conductivity type, wherein the seventh transistor has a first conduction terminal coupled to the second input terminal; and
an eighth transistor having the second conductivity type, wherein
the eighth transistor has a first conduction terminal coupled to a second conduction terminal of the seventh transistor,
the eighth transistor has a second conduction terminal coupled to the first output terminal, and
the eighth transistor has a control terminal coupled to the second output terminal.

30. The full-bridge converter of claim 29, wherein:
the first transistor, the third transistor, the fifth transistor, and the seventh transistor each have a first voltage rating; and the second transistor, the fourth transistor, the sixth transistor, and the eighth transistor each have a second voltage rating, and wherein the second voltage rating is higher than the first voltage rating.

* * * * *